TEMPORARY NOTICE of BEST AVAILABLE IMAGE

U. S. PATENT AND TRADEMARK OFFICE

THE SCANNED IMAGES OF PATENT NUMBER 9611 1/2X FOR THE ISSUE DATE OF 4/21/1836 ARE NOT THE COMPLETE ORIGINAL DOCUMENT, BUT CONTAIN A COPY OF THE BEST AVAILABLE TEXT AND IMAGE DATA FROM VARIOUS SOURCES.

WHEN THE MISSING INFORMATION BECOMES AVAILABLE, THE DOCUMENT WILL BE RESCANNED AND REPLACED.

ANY QUESTIONS SHOULD BE DIRECTED TO THE DATA MAINTENANCE BRANCH BY TELEPHONE AT (703) 306-3116.

TEMPORARY NOTICE of BEST AVAILABLE IMAGE

James M. Woolfolk Oldham Kentucky

Letters Patent

The Schedule referred to in these Letters Patent and making part of the same containing a description in the words of the said James M Woolfolk himself of his Improvement in the Single Lever Straw Cutter.

To all to whom these presents shall come Be it known that I James M Woolfolk of the County of Oldham in the State of Kentucky have invented a new and useful improvement in the construction of the Single Lever Straw Cutter and that the following is a full and exact description thereof. The frame which receives the box must be made in the following form and dimension the sill to receive the upright posts must be 2 feet 9 inches long 8 by 4 inches square with two upright posts 3 ft 4 inches long 8 by 4 inches square set in the sill by two mortices one foot apart in the clear with a cross bar to receive the box 2 ft from the sill the posts to have a groove cut in each 1½ inches wide and one inch deep to receive the gate or frame to which the knife is fixed upon the gate is 2 ft 1 ft [illegible] inches wide from out to out 1½ inches thick. the knife is put on with 2 screw bolts to be taken off on at leisure to sharpen the same the Spring or form of which is to assist the gate to receive the straw to be cut, the lever is to be put on with a crank of 2½ inches sweep in an arm in the outside frame and connected to the gate which the knife is on with a bolt passing through the gate on the lever the lever is to be three feet long. The box 3 ft 4 inches long 3 inches deep ten inches wide with a cross piece in the mouth to keep the straw from passing above the knife The steel is to be placed in the bottom of the mouth of box for the knife to work against the knife to be placed on in a slope of four inches from square. the machine is fed and worked with the hands. The stop or guide to regulate the length of straw to be cut is put on with four screws for the purpose of shortening or lengthen the same What I Claim as my own invention and not previously known is the above described machine as the whole exclusive of the box only James M. Woolfolk [illegible]

Witnesses. W. H. Field
R. N. Woolfolk

[illegible]

Drawing made from [illegible]